July 20, 1954  R. G. ATKINSON  2,683,972
RECOVERY OF NATURAL GAS CONDENSATE
Filed Oct. 30, 1951
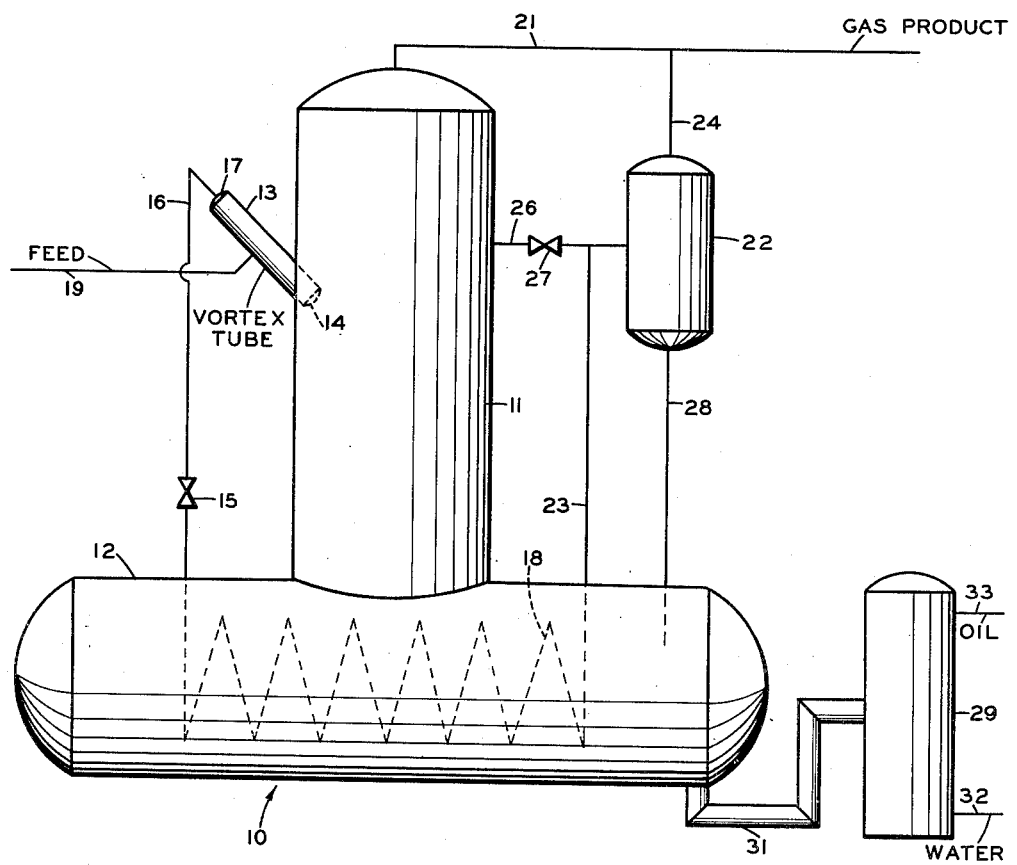
INVENTOR.
R. G. ATKINSON
BY Hudson and Young
ATTORNEYS Patented July 20, 1954

2,683,972

UNITED STATES PATENT OFFICE 2,683,972

RECOVERY OF NATURAL GAS CONDENSATE

Robert George Atkinson, Bartlesville, Okla., assignor to Phillips Petroleum Company, a corporation of Delaware Application October 30, 1951, Serial No. 253,939

4 Claims. (Cl. 62—122)

This invention relates to a new method for the recovery of moisture and hydrocarbon liquids occurring in natural gas streams. In one of its more specific aspects it relates to apparatus for carrying out this method. In another of its more specific aspects, this invention relates to the use of a vortex tube in the process of recovering these products which is particularly applicable to the treatment of high pressure natural gas streams.

In the high pressure gas streams, as they flow from the earth, there is a considerable quantity of water, water vapor, and condensable hydrocarbons. If such a stream is passed directly into the gas lines there will be some hydrocarbon condensation. Also, some of the water will condense and result in hydrate formation. In the gas line this will interfere with valve operation, and also reduce the amount of gas which can flow through the line.

It is known that this hydrate formation occurs as a result of lowering of the pressure and the reduction of the temperature. More accurately, when there is a reduction in pressure a corresponding drop in temperature occurs which causes water condensation, and, as a result, gas hydrates are formed. In the past, knockout chambers have been used near the well in order to remove liquids that have condensed as the gas comes to the surface. This has not usually been sufficient to provide a gas stream which has a low enough moisture content for supply to long transmission lines.

By various aspects of this invention, one or more of the following objects will be obtained.

It is an object of this invention to provide a method and means for recovering the moisture and the condensable hydrocarbons from such a stream.

It is a further object of this invention to provide apparatus to carry out this invention wherein the gas is cooled, hydrates are formed and removed, and condensable hydrocarbons are removed, so that resultant gas can be introduced into the gas distribution line, without the danger of hydrate formation.

A still further object of this invention is directed to a method in which all of the heat transfer necessary for carrying out this separation is provided by the energy of the gas and external sources are not required for heating or cooling the gas.

Still further objects will be apparent to one skilled in the art upon reading this specification.

The construction designed to carry out this invention will be described hereinafter together with other features thereof.

The invention will be more readily understood from a reading of the following disclosure and by reference to the accompanying drawing forming a part thereof.

In the drawing 10 is the separation chamber. This separation chamber comprises two parts, a cold zone 11 and a warm zone 12. The cold zone 11 is comprised of a large upright chamber in which the hydrates can form. The hydrates on forming then fall into warm zone 12. Positioned at one side of the zone 11 is a vortex tube 13, with its cold end 14 extending into the cold zone. A conduit 16, provided with valve 15, connects hot end 17 of the vortex tube and coil 18, which is positioned in the warm zone 12. Gas flows from the well, or other high pressure apparatus (not shown) through line 19 into the vortex tube. Conduit 21 is provided to remove as overhead the dehydrated gas from the upper portion of chamber 11. A knockout chamber 22 is located in the gas line 23 between the point where this line 23 emerges from the warm zone and gas outlet 24. Conduit 26 connects line 23 with the cold zone 11 and is provided with a valve 27 to permit a portion of this gas to be returned to the cold zone 11. Conduit 28 is a return line for the liquids collected in knockout chamber 22 and returns these liquids to the warm zone 12. Separator 29, which is connected to warm zone 12 by means of conduit 31, provides for separation of the oil and water formed by means of the difference in specific gravities. The removal lines are designated 32, for water removal, and 33 for oil removal.

The vortex tube 13 may alternatively be called a Ranque tube or a Hilsch device. The construction and some of the operating features of such a tube are described in U. S. Patent 1,952,281, issued March 27, 1934 to Ranque.

As set forth in the aforementioned patent, the vortex tube may include a chamber having the shape of a surface of revolution, such as a cylinder, this chamber having an inlet pipe for tangentially introducing the gas to be treated into a central region of the chamber. A gyratory motion is imparted to the fluid as it enters the chamber, and means are provided to divide the gas into two concentric sheets moving along each other so that the outer sheet is compressed by the inner sheet and by the action of centrifugal force. The work thus produced causes a substantial rise in temperature in the outer sheet and a corresponding drop in the temperature of the inner sheet.

The operation of the apparatus of my invention is as follows: the gas, containing water, water vapor, condensable hydrocarbons and lighter gases, can be passed directly from the well into line 19, and into the vortex tube 13. In this tube the gas stream is divided into a hot stream and a cold stream. The cold stream is passed out of the end 14 and into the chamber 11 wherein the water condenses along with condensable hydrocarbons as a result of the reduced temperature. In zone 11 the conditions are maintained so that hydrate formation will result. The condensed hydrocarbons, hydrates, and water fall by gravity into the warm zone 12 where they are melted. Heat is supplied to the warm zone by the warm stream flowing from the hot end 17 of the vortex tube, through line 16, and into coil 18 located in this zone. Valve 15 is adjusted so that the proper division of the input stream will pass out the cold and hot ends of the vortex tube. Flow from the hot end should be sufficient to melt the hydrates formed in the cold zone and to prevent hydrate formation in coil 18. I prefer to regulate this so that 50 to 95 per cent flows out the cold end.

The uncondensable fraction of the input stream is removed from the upper part of zone 11 by means of conduit 21. This gas may be passed directly to a high pressure line for transportation to the place of consumption or, of course, may be stored at some convenient location.

The fraction flowing through coil 18 is maintained at a high enough temperature by controlling the amount of heated gas flowing therethrough. Because of the lowering of the pressure, some water and higher molecular weight hydrocarbons are condensed in this line. Therefore, before this gas is utilized, it is passed through knockout chamber 22. The liquid components in this stream are returned to the warm zone 12 through line 28. At this stage the gaseous fraction of this stream passes out through line 24, and generally, has a low enough moisture content that it may be mixed with the product gas in line 21. If desired, a portion of the stream in line 23 may be returned to the cold zone 11 through line 26. The amount of this return is regulated by means of valve 27 placed in this line. This is necessary if there is more water in this stream than can be safely introduced into line 21.

The liquid products in the warm zone 12 pass through line 31 into separating chamber 29 wherein the hydrocarbon fraction will float on top of the water. By means of liquid level controls (not shown) the oil and water are removed through lines 33 and 32, respectively.

This invention can be used on practically all natural gas streams. Pressures in such streams may run as low as 200 p. s. i. up to 6000 p. s. i. In order that efficient use may be made of the vortex tube, I have found that it is preferable to have the pressure at the vortex within the range of 2000 to 4000 p. s. i. These pressures are preferable so that sufficient downstream pressures will result, these usually being in the range of 600 to 1300 p. s. i. and preferably, from 800 to 1100 p. s. i.

This invention can be used to remove various amounts of water from the line. Sufficient water should be removed so that the product gas will have a dew point lower than the lowest temperature to which it will be exposed during transportation. For normal operation this will be 0° F. or slightly lower.

The temperatures in the hot and cold zones should be such that sufficient water is removed to give this dew point in the produced gas. The cold zone will generally be at a temperature from 0 to 20° F. The warm zone must be maintained at a temperature high enough to melt the hydrates which are formed. This again depends upon the pressure but is usually at least 65° F. Temperatures up to 80° or 90° F. are used when it is desired to get rapid melting of the hydrates.

In order that my invention may be readily understood, the following example using specific pressures and temperatures is given. It is not intended that these specific temperatures and pressures are to be considered in a limiting sense but only in an illustrative sense.

For example, I will use the stream from a high pressure well at a temperature of 120° F. and a pressure of 2500 p. s. i. When this stream is admitted to the vortex tube and the rates of flow adjusted so that 80 per cent of the input flows from the cold end and 20 per cent of the input flows from the hot end, the conditions in the cold zone will be as follows: temperature, 5° F.; pressure, 1000 p. s. i. The hot end stream will have a temperature of 150° F. and a pressure of 1200 p. s. i. As previously stated, adjustment of the valve in line 16 will permit different amounts to flow from the hot and cold ends. The hot stream passing through coil 18 will warm the liquid in this zone to about 70° F. Gas produced in this system, as illustrated, has a dew point of approximately −5° F.

This invention is much simpler and uses far lower amounts of apparatus than is usually used to remove the condensable products from such a natural gas stream. Further, no external heating or cooling is necessary, and, as the hot gas stream is used to melt the hydrates, freezing and clogging of the heating coil is not a problem since this gas has a temperature considerably above the hydrate formation point. I have found that the amount of oil condensate recovered by my method is about 10 to 15 per cent greater than that which is recovered when heater-separator equipment is used. The use of the vortex tube permits greater flexibility of operation due to its heating and cooling effect. This will permit hydrate formation even when dealing with inlet gases of relatively low pressure. This is a distinct advantage over the simple Joule-Thompson effect, wherein a gas stream is merely expanded through an orifice.

If desired direct heat exchange or a combination of direct and indirect heat exchange can be employed in zone 12 to melt the hydrates. Perforations or jets are used to introduce the hot stream directly into the liquid layer. A deeper chamber can be utilized if desired.

As many possible embodiments may be made of this invention without departing from the scope thereof, it is to be understood that all matter herein set forth or shown in the accompanying drawing is to be interpreted as illustrative and not in a limiting sense.

I claim:

1. Apparatus for reducing the moisture content of a high pressure gas stream comprising a condensation chamber having a cold zone in its upper portion and a warm zone in its lower portion, a vortex tube connected to the cold zone of the condensation chamber for dividing said stream into a heated stream and a cooled stream; a feed conduit connected to said vortex tube; a gas removal conduit extending from said cold zone; means for utilizing the stream from the hot end of said vortex tube to supply heat to the warm zone of said condensation chamber; a liquid outlet conduit extending from the lower end portion of said condensation chamber; and separating means connected to said liquid outlet conduit for recovering the non-gaseous products of the stream from the hot end of said vortex tube.

2. Apparatus for separating into its components a gas stream flowing from a high pressure well, comprising, a separator vessel having a cold zone in its upper portion and a warm zone in its lower portion, a vortex tube positioned near said separator, a first conduit leading from the cold end of said vortex tube into said cold zone a coil in said warm zone, a second conduit leading from the hot end of said vortex tube to said coil for indirect heat exchange in said warm zone; a gas removal conduit extending from said cold zone; a third conduit connecting the down stream end of said coil with said gas removal conduit; a knockout unit positioned in said third conduit to remove liquids from said gas stream whereby the gaseous fraction is removed as a product and the liquid fraction is returned to the warm zone; a a separating tank; and a conduit leading from said warm zone to said separating tank, said tank having water and liquid hydrocarbon removal conduits.

3. Apparatus for reducing the moisture content of a high pressure gas stream comprising a condensation chamber having a cold zone in its upper portion and a warm zone in its lower portion; a vortex tube with cold end thereof extending into the cold zone of the chamber; a coil in said warm zone, a conduit extending from the hot end of said vortex tube to said coil for indirect heat exchange in said warm zone, a gas removal conduit extending from said cold zone; a third conduit connecting the down stream end of said coil and said gas removal conduit; a knockout unit positioned in said third conduit to remove liquids from said stream whereby the gaseous fraction is removed as a product and the liquid fraction is returned to the warm zone; a separating tank; a conduit leading from said warm zone to said separating tank; and water and liquid hydrocarbon removal conduits.

4. Apparatus for reducing the moisture content of a high pressure gas stream comprising a condensation chamber having a cold zone and a warm zone, a vortex tube connected to the cold zone of the condensation chamber for dividing a feed stream into a heated stream and a cooled stream; a feed conduit connected to said vortex tube; a gas removal conduit extending from said cold zone; means for utilizing the stream from the hot end of said vortex tube to supply heat to the warm zone of said condensation chamber; and liquid outlet conduit means extending from said warm zone.

References Cited in the file of this patent

UNITED STATES PATENTS

| Number | Name | Date |
|---|---|---|
| 1,620,163 | Milliff et al. | Mar. 8, 1927 |
| 1,952,281 | Ranque | Mar. 27, 1934 |
| 2,475,255 | Rollman | July 5, 1949 |
| 2,522,787 | Hughes | Sept. 19, 1950 |
| 2,528,028 | Barry | Oct. 31, 1950 |
| 2,581,168 | Bramley | Jan. 1, 1952 |